(12) United States Patent
Sim

(10) Patent No.: US 6,529,786 B1
(45) Date of Patent: Mar. 4, 2003

(54) QUEUE MANAGEMENT SYSTEM

(75) Inventor: Leonard Sim, Berkshire (GB)

(73) Assignee: LO-Q PLC, Oxfordshire (GB)

(*) Notice: Subject to any disclaimer, the term of this patent is extended or adjusted under 35 U.S.C. 154(b) by 0 days.

(21) Appl. No.: 09/068,701

(22) PCT Filed: Nov. 15, 1996

(86) PCT No.: PCT/GB96/02810

§ 371 (c)(1), (2), (4) Date: Dec. 8, 1998

(87) PCT Pub. No.: WO97/18534

PCT Pub. Date: May 22, 1997

(30) Foreign Application Priority Data

Nov. 15, 1995 (GB) .............................. 9523443

(51) Int. Cl.⁷ .............................................. G06F 17/00
(52) U.S. Cl. ................................ 700/90; 705/5; 705/6
(58) Field of Search .......................... 700/90, 1; 705/5, 705/6, 15, 18, 25, 41, 416; 340/5.2, 5.61, 5.62, 5.63, 5.7, 10.1, 10.6, 825.49, 825.28, 825.29, 7.3, 10.32, 10.31

(56) References Cited

U.S. PATENT DOCUMENTS

| | | | | |
|---|---|---|---|---|
| 4,298,793 A | * | 11/1981 | Melis et al. ................. | 235/488 |
| 4,398,257 A | * | 8/1983 | Paganini et al. ............. | 713/300 |
| 4,512,667 A | * | 4/1985 | Doulton et al. .............. | 368/10 |
| 5,287,269 A | | 2/1994 | Dorrough et al. ............ | 705/17 |
| 5,305,197 A | * | 4/1994 | Axler et al. .................. | 705/14 |
| 5,408,417 A | * | 4/1995 | Wilder ......................... | 705/5 |
| 5,502,806 A | * | 3/1996 | Mahoney et al. ........... | 345/839 |
| 5,946,444 A | * | 8/1999 | Evans et al. ................. | 386/46 |
| 5,978,770 A | | 11/1999 | Waytena et al. ............. | 705/5 |
| 5,987,420 A | * | 11/1999 | Maeda et al. ................ | 705/5 |
| 5,987,421 A | | 11/1999 | Chuang ........................ | 705/7 |
| 6,173,209 B1 | * | 1/2001 | Laval et al. .................. | 700/91 |
| 6,329,919 B1 | * | 12/2001 | Boies et al. ................ | 340/573.1 |

FOREIGN PATENT DOCUMENTS

| | | |
|---|---|---|
| BE | 1006392 A3 | 8/1994 |
| EP | 0 086 199 B1 | 4/1987 |
| FR | 2612669 * | 9/1988 |
| FR | 2 612 669 | 9/1988 |
| FR | 2 650 095 | 1/1991 |
| GB | 2 193 359 B | 7/1990 |
| GB | 2 228 123 A | 8/1990 |
| JP | 01134565 | 5/1989 |
| JP | 5073596 | 3/1993 |
| JP | 07234893 | 9/1994 |
| WO | WO 90/09002 | 9/1990 |

\* cited by examiner

*Primary Examiner*—Maria N. Von Buhr
*Assistant Examiner*—Chad Rapp
(74) *Attorney, Agent, or Firm*—Westman, Champlin & Kelly, P.A.

(57) ABSTRACT

A queue management system comprises a plurality of portable modules, at least one docking station, a queue manager, signal transmitting means, at least one module detector and a communication means. Each portable module includes a memory means containing a unique identification code, an indicator means, transmitter means for transmitting the identification code over a short range, and docking means for downloading the identification code. The docking station registers the person in a queue by downloading the identification code for the portable module when docked. The queue manager maintains the queue sequence for each queue and includes a communication means for receiving the downloaded code. The signal transmitting means is associated with the queue manager for transmitting the signals to each portable module to instruct the person carrying the portable module to join the queue. The module detector detects transmitted identification codes from any portable module in its vicinity. The module detector is arranged at the queue to detect when the person carrying the portable module joins the queue. Finally, the communication means is arranged between the queue manager and the module detector to communicate any detected identification code to the queue manager.

44 Claims, 10 Drawing Sheets

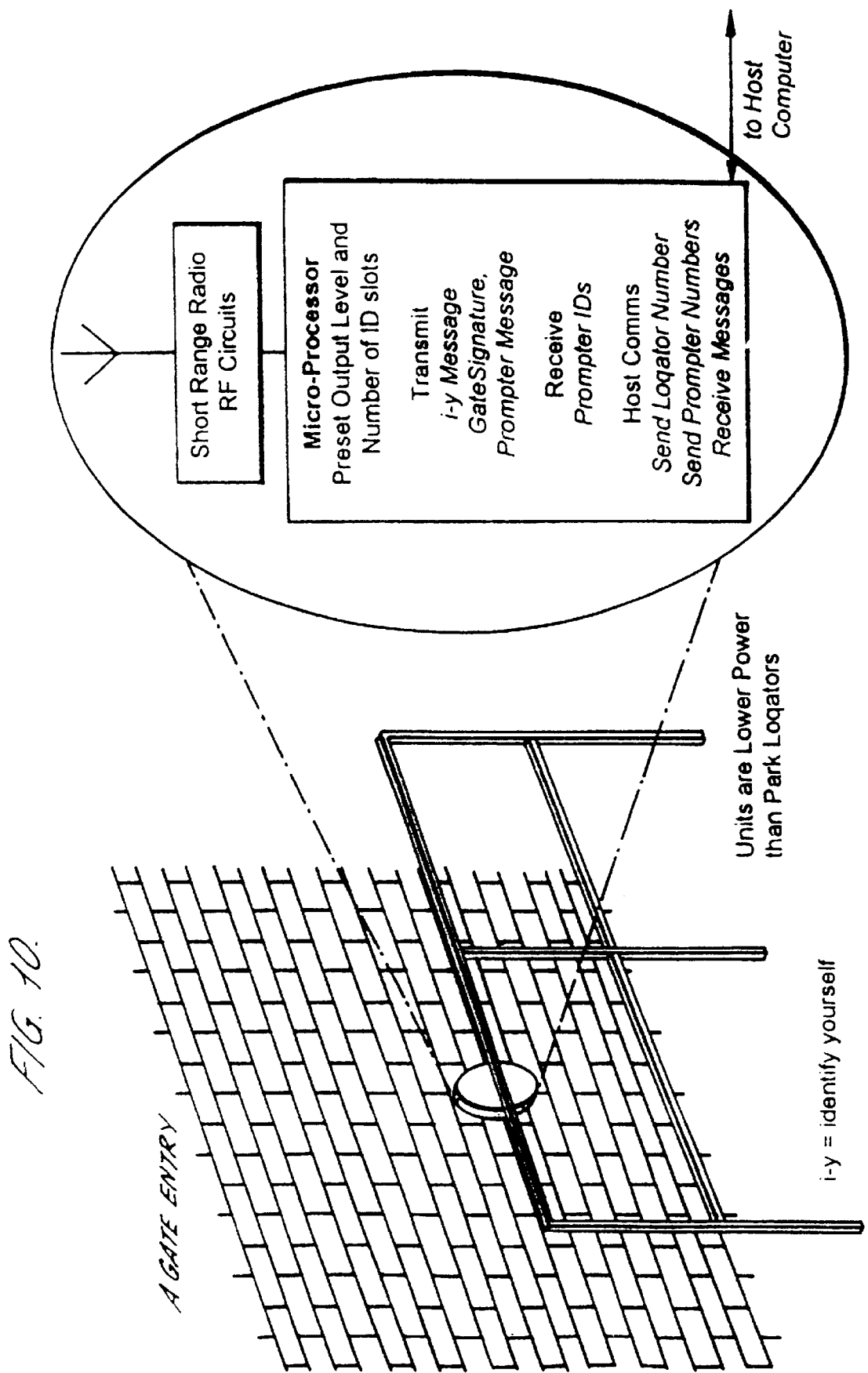

QUEUE MANAGEMENT SYSTEM

FIELD OF THE INVENTION

The present invention generally relates to a queue management system for managing at least one queue of people.

BACKGROUND OF THE INVENTION

In many leisure pursuits (such as theme parks and museums) and other activities (such as arranging visas and immigration procedures), a large amount of time can be spent waiting in queues. The queuing is a frustrating and unproductive use of the time of the person in the queue and can be economically inefficient for the enterprise concerned. However, significant queues are necessary for at least part of the time in order to make efficient use of the particular resources.

The problem of managing queues has been addressed in the prior art such as in EP0086199. In the system disclosed in EP0086199 a queue sequence for serving customers at a number of service points is determined once a customer has been allocated a turn number. The customer can then be told which queue to attend by observing a display.

This prior art arrangement is particularly suitable for queues such as in supermarkets wherein the queue time is generally not that long and the person will therefore accept the necessity for waiting near the queuing area and viewing the display. However, for multiple queues at remote locations or for one or more queues which have a considerable delay associated therewith, the system does not enable the person queuing to physically leave the queue without there being a possibility of the person losing their place in the queue.

It is therefore an object of the present invention to provide a queue management system which allows people to join a "virtual" queue, thus freeing the person from having to wait near the queue.

SUMMARY OF THE INVENTION

The present invention provides a queue management system for managing at least one queue of people, the system comprising a plurality of portable modules, each portable module being arranged to be carried by a person or a group of people and including memory means for containing a unique identification code, indicator means for indicating to said person or group of people when it is time to join the or each queue, signal receiver means for receiving signals to cause said indicator means to be operate, transmitter means for transmitting said identification code over a short range to confine the transmitted identification code to a local region around said person or group of people, and docking means for downloading said identification code when said portable module is docked; at least one docking station, the or each docking station being adapted to co-operate with said docking means of a said portable module for registering said person or group or people in queue sequence for a respective queue by downloading said identification code from said portable module when docked; a queue manager for maintaining the queue sequence for the or each queue and including first communication means for receiving the or each downloaded code, and a transmitter for transmitting said signals to each portable module to instruct said person or group of people carrying a said portable module to join a queue; at least one module detector for detecting any portable modules in the vicinity of the or each module detector by detecting any transmitted identification codes, a said module detector being arranged at the location of the or each queue to detect when the person or group of people carrying said portable module joins the queue; and second communication means arranged between said queue manager and the or each module detector to communicate any detected identification codes to said queue manager; said queue manager being adapted to updated the or each queue sequence using the or each detected identification code and the or each downloaded identification code to remove the or each detected identification code from the front of the respective queue sequence and to add the or each downloaded identification code to the back of the respective queue sequence.

The present invention can thus provide a queue management system which allows people who wish to queue to be free to undertake other activities. The time involved in physically queuing can be drastically reduced to perhaps a few minutes. The system maintains the place of users in each queue and informs them when they should physically join the queue.

The present invention can be employed in theme parks as a queue management system for all of the guests, or for a proportion of the guests who are willing to pay a premium, or one of a range of premiums corresponding to a range of privileges.

Conveniently, the method of communicating between the portable modules and the queue manager is by way of radio paging messages which can be received and displayed by the portable modules.

Although conveniently the indication by the indicator means can be passed to the user visually, e.g. by a display, the indications could be audible, e.g. a spoken message or a tone.

The present invention also can provide information on the whereabouts of the users of the system which can, in some applications, provide very useful management information, and can give the ability to influence users' movements, that can lead to economic advantages. In order to facilitate this, in accordance with one embodiment of the present invention the system includes at least one additional module detector provided at locations away from the or each queue for detecting any portable modules in the vicinity of the or each additional module detector by detecting any transmitted identification codes, the or each additional module detector being connected to the queue manager by the second communication means and the queue manager being adapted to use any detected identification codes to track the locations of each person or groups of people carrying a portable module.

Advantageously, the system may further comprise at least one automatic registration gate connected to said queue manager by said second communication means, the or each said automatic registration gate corresponding to a respective queue and including a module detector arranged to detect only portable modules passing through the automatic registration gate by detecting any transmitted identification codes, and said queue manager adapted to update the respective queue sequence using the identification codes detected by the automatic registration gate to add the detected identification codes to the back o; the respective queue sequence.

Preferably, at least one of said module detectors arranged at the location of the or each queue is incorporated in a gate unit, and is further arranged to detect only the transmitted identification codes of portable modules passing through the gate unit.

In an alternative embodiment, in order for the system to be able to distinguish whether a user is merely in the vicinity of a queue or has actually joined a queue, at least one of the module detectors S arranged at the location of the or each queue may include a pair of detecting antennae arranged as a gate through which a person or group of people carrying a portable module will pass to join a queue. In this arrangement either the queue manager or the or each module detector includes correlation means to correlate signals for any detected identification codes from the pair of detecting antennae to determine whether a portable module has passed therethrough and if so to pass the detected identification code to the second communication means.

In this way the module detectors can identify whether the user is merely in the vicinity or has actually joined the queue. if the user is merely i the vicinity, the second communication means passes the detected identification codes flagged as representing portable modules being only in the vicinity of the module detector. Alternatively, the identification codes detected by the pair of detecting antennae are passed by the second communication means to the queue manager where the correlation is carried out to determine whether a user has passed through or merely by the pair of antennae.

Advantageously, the signal transmitting means may comprise at least one transmitter.

Advantageously, the signal transmitting means may comprise one or more signal transmitters, the or each signal transmitter being provided in a respective one of said module detectors.

Preferably, the signal transmitter is a short range radio transmitter.

In one embodiment the transmitter means of each portable module is adapted to periodically transmit the identification code stored in its memory means.

In an alternative embodiment the or each module detector includes a prompting transmitter for transmitting a prompting signal over a short range to cause any portable modules in range to respond by transmitting their identification codes, each portable module including prompt receiving means for receiving he prompting signal and the transmitter means of each portable module being responsive to the received prompting signal to transmit the identification code stored in its memory means.

Thus, when a portable module comes within range of a module detector, its transmitted identification code will be received by the module detector and passed on to the queue manager. In order to avoid conflicts between transmissions from more than one portable module at the same frequency at the same time, interference can be avoided by delaying the transmission of the identification code for a random or pseudo-random delay period. Alternatively, some of the portable modules can transmit the identification codes at different frequencies or each portable module transmitting at the same frequency could transmit the identification code after a unique delay period.

In one embodiment the or each module detector transmits a unique prompting signal and the portable modules include identification means to compare the unique prompting signal with a stored prompting signal corresponding to a respective queue to determine whether the person or group of people are at the correct queue, and means to indicate to the person or group of people whether or not the person or group of people are located in the correct queue.

In a further embodiment, the prompting transmitter transmits an identifying prompting signal indicative of the range of said identifying prompting signal, and said portable module is operable in response to said identifying prompting signal to set the range of its identification code transmission-.

When the system is designed for use in a defined area, e.g. theme park which has exits, the system preferably includes at least one module detector at each exit to detect portable modules to prevent the portable modules being removed from the defined area. This prevents the loss of the portable modules by deliberate or accidental removal from the defined area.

Preferably the or each docking station includes queue display means for displaying a selection of queues which the person or group of people may wish to join, input means to allow the person or group of people to select which queue they wish to join and downloading means for downloading the identification code of the docked portable module, for passing the downloaded identification code to the queue manager via the first communication means, and for passing the identity of the or each queue which the person or group of people wish to join to the queue manager via he first communication means. The queue manager is adapted to register the person or group of people in at least one queue sequence dependent upon the downloaded identification code and the received queue identity.

In an alternative embodiment, a person can remotely register for a plurality of queues using a remote input arrangement, e.g. a display and keys. Such an arrangement could for instance be provided at the user's hotel. When a user registers in this way a portable module identification code (or the portable module itself) is assigned to that user. The user can then either pick up the assigned module later or by for example using a password, select a portable module S and have the assigned identification code uploaded to the portable module when the portable is docked. For this facility a means of identifying such a user is required. This can take the form of a password for example which can be given to an attendant to receive the assigned portable module or it can be input to the docking station when a portable module is docked to cause the queue manager to upload the assigned identification code.

In order for the queue manager to receive data on is the person or group of people who are using the portable module, the display means and the input means of the or each docking station are preferably adapted to respectively display requests for data on the person or group of people and to allow the input of such data for transmission to the queue manager via the first communication means.

The docking station conveniently allows the person or group of people to select a preferred sequence of queues to be joined and preferred times of joining the queues and allows the reselection of the preferred sequence and the preferred times at a later time.

For multiple queues, the queue manager optimises the position of a person or group of people in each of the queue sequences to allow the person or group of people to join each queue and attend each event being queued for. In order to do this, the queue manager preferably includes queue information storage means to store information on the predicted rate at which the or each queue will move and the actual rate of queue movement and the queue manager is adapted to use the store information to optimise the length of the or each queue sequence and to enable the optimisation of the sequence of queues. Once the queue manager has determined the optimum queue sequence, it transmits data on the queue sequence and times at which the queue should be joined to the portable modules and this data is stored in the memory means of each portable module for display.

In order to avoid the necessity for transmitting a large number of messages to each portable module, in accordance with one embodiment of the present invention each portable module includes a message memory for storing a plurality of standard messages. The queue manager is adapted to send a desired message activation signal to the selected portable modules whereupon the selected portable modules display a desired message from the stored plurality of messages on th display in response to the activation signal.

In one embodiment the queue manager is able to send a control signal to selected said portable modules whereupon the selected portable modules respond by switching the mode of operation to revert to a normal pager messaging mode.

In one embodiment, when a user registers for a queue sequence, the time of registration is logged by the queue manager. The queue manager is able to transmit messages to each of the portable modules which have been registered within a certain time window. This feature is useful where managers of a theme park wish to allow its users only a limited number of hours of access to the park or to certain activities. A message can be sent to the users which registered within a time window. This allows a transmission of a "time-out" message transmitted to the users which are registered within a time window to indicate that they no longer have access to the park or to certain activities and should leave.

In the present invention when a portable module indicates that the user should join a queue, there is no guarantee that the user will respond by joining the correct queue at the correct time. Therefore, in order to ensure that the multiple queue sequencing runs smoothly, the present invention preferably includes an access control mechanism associated with the or each module detector to allow access to a queue area for a queue and the queue manager is adapted to compare an detected identification code with the identification codes of the queue sequence associated with the queue to determine if the detected identification code falls within a predetermined range of the front of the queue sequence, and to transmit an access denied signal over the second communication means to the access control mechanism if the detected identification code is determined to be outside the predetermined range. The access control mechanism is then responsive to the access denied signal to prevent a person or a group of people carrying the portable module associated with the detected identification code from gaining access to the queue area. Preferably the queue manager is adapted to transmit an explanatory message to the portable module which has been denied access to the queue area to explain the reason why access has been denied.

Alternatively, each portable module is adapted to stare a default acceptance time window associated with each queue for which the identification code of the portable module has been entered in the queue sequence reason messages, a portable module which has been denied access being adapted to identify the module detector to determine whether the portable module is at the correct queue area at the correct time, and to select and display an appropriate reason message to explain why access has been denied.

In one embodiment a plurality of portable modules can be assigned as a group and each member of a group of portable modules has an identification code which identifies which group the portable modules belong to. The or each docking station is adapted to allow the selection of the option for the members of a group of people to allow them to each have a portable module. For members of a group, when one member places the portable module in the docking station, it is possible for that member to input a group specific message which is sent by the queue manager to all members of the group. It is also possible for the group member to request information on the locations of the group members. The queue manager is able to provide such information which is then displayed at the docking station to allow the group member to locate other members of the group.

Since the queue manager is able to monitor the location of the portable modules, it is possible for the queue manager to send area specific messages to portable modules which are known to be in a specific area. Such messages can for instance be prompting advertisements for local attractions or information on local facilities.

When the portable module is docked in the docking station, it is possible for a user to select the language of the messages to be displayed by the portable unit. Also, the queue manager is able to set the messages which are stored in the message memory and the frequency of operation of the transmitter means within the portable module. Further, the queue manager can download the default acceptance time window, e.g. +5 mins, –10 mins.

In one preferred embodiment the present invention can also provide a plurality of portable tagging modules, each portable tagging module being arranged to be carried by a person or a group of people to be tracked. Each portable module comprises memory means for containing the unique identification code, transmitter means for transmitting the identification code over a short range to confine the transmitted identification code to a local region around the person or group of people carrying the portable tagging module, and docking means for docking with the or each docking station for downloading the S identification code to the queue manager. The or each docking station is adapted to allow a person or group of people carrying a portable module to associate at least one portable tagging module with the portable module. A docking station can prompt the selection of a tagging option when the portable module is docked to download the identification code thereof and to subsequently request the docking of a portable tagging module to download the identification code thereof. The queue manager is then responsive to the downloaded identification codes to associate the identification codes. The or each docking station is further able to transmit a location request signal for associated identification code of a portable module or tagging module when a portable module or portable tagging module is docked. The queue manager responds to the location request signal to transmit Information on the location of the associated portable module or portable tagging module to the docking station for display thereby.

Where there are fees associated with one or more queues, in accordance with one embodiment the or each docking station includes payment means for receiving payment in respect of a queue which has a fee associated therewith. The payment means is adapted to request payment and await receipt of payment before registering a person or group of people in a queue sequence for a desired queue which has a fee associated therewith.

In an alternative embodiment of the present invention each docking station includes payment means for receiving payment to be credited to the person or group of people carrying a portable module and the payment is associated with the identification code of the portable module. The queue manager includes credit storing means for receiving and storing information on the payment to be credited to a portable module from the docking station, queue cost information memory means containing information on the cost of the or each queue which has a fee associated therewith, and debiting means for debiting funds from the credit stored in the credit storing means when the queue manager receives a downloaded identification code from the module detector at a queue which has a fee associated therewith. The queue manager is adapted to transmit information on stored credit the credit storing means through a portable module to that portable module for display to allow the user to determine how much credit he has left.

In the above alternative embodiments the payment means can conveniently comprise a credit card reader.

It can thus be seen from the above that the system can conveniently comprise a combined short range pager unit and electronic tag, gate units and a base station including a controlling computer.

In the present invention the queue sequence comprises a "virtual" queue which conveniently resides in a computer system's memory and holds a user's place in the queue in the same order as if he had remained physically present.

Embodiments of the present invention will now be described with reference to the accompanying drawings, in which:

FIG. 10 illustrates a gate unit in accordance with the embodiment of FIG. 9.

Figure 1:
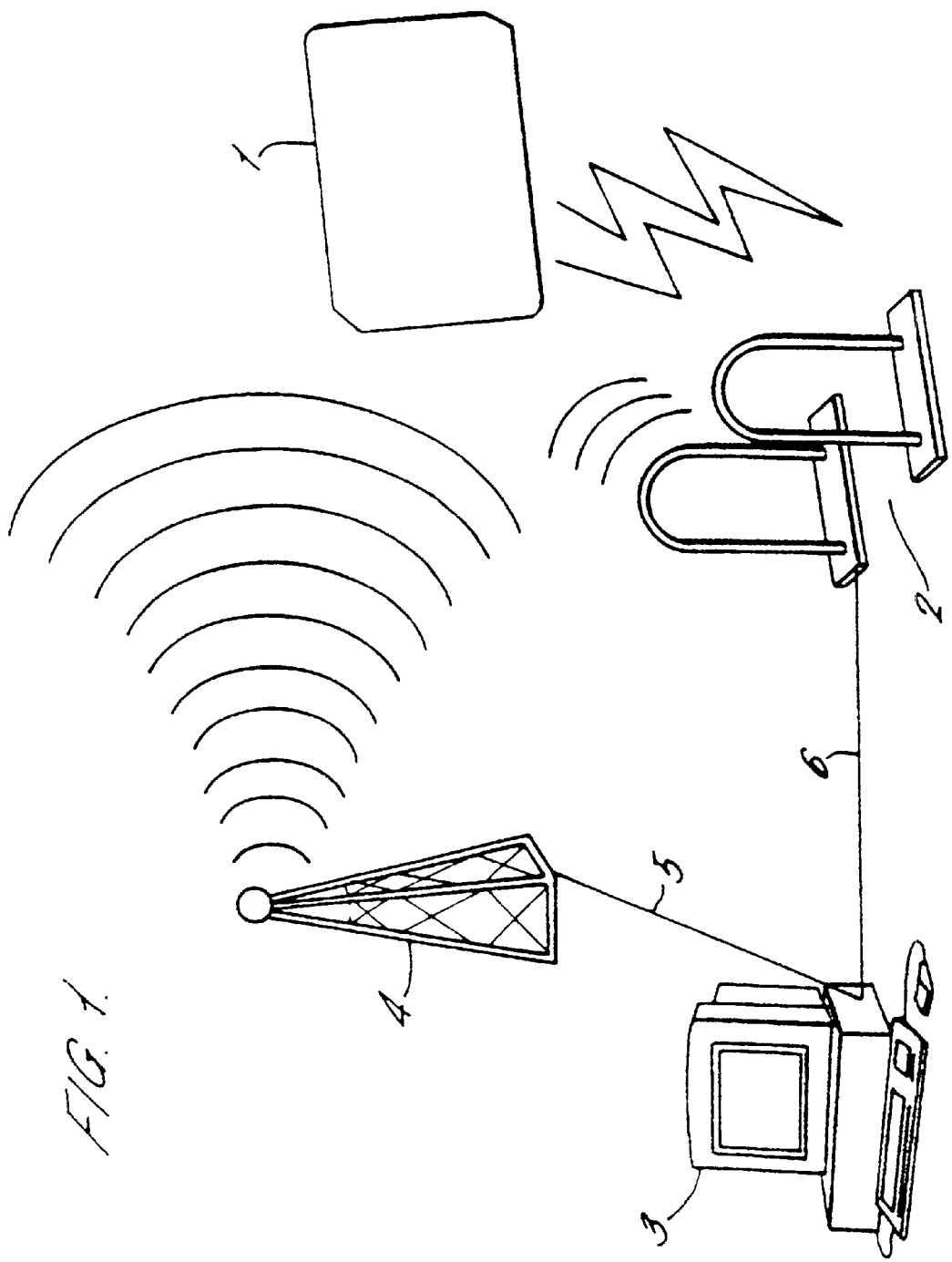
FIG. 1 is a schematic drawing of the basic elements of the system in accordance with one embodiment of the present invention.

Referring now to the drawings, as can be seen in FIG. 1 the system comprises a portable module comprising a combined short range pager unit and electronic tag, gate units 2 and a base station comprising a controlling computer 3 and a transmitter 4. The controlling computer 3 is linked to the transmitter 4 by a communication line 5 to allow the transmission of messages to the portable module 1. The controlling computer 3 is also linked to the gate units 2 by a further communication line 6 to receive downloaded identification codes which have been detected by the gate unit 2 from the portable unit 1.

Figure 2:
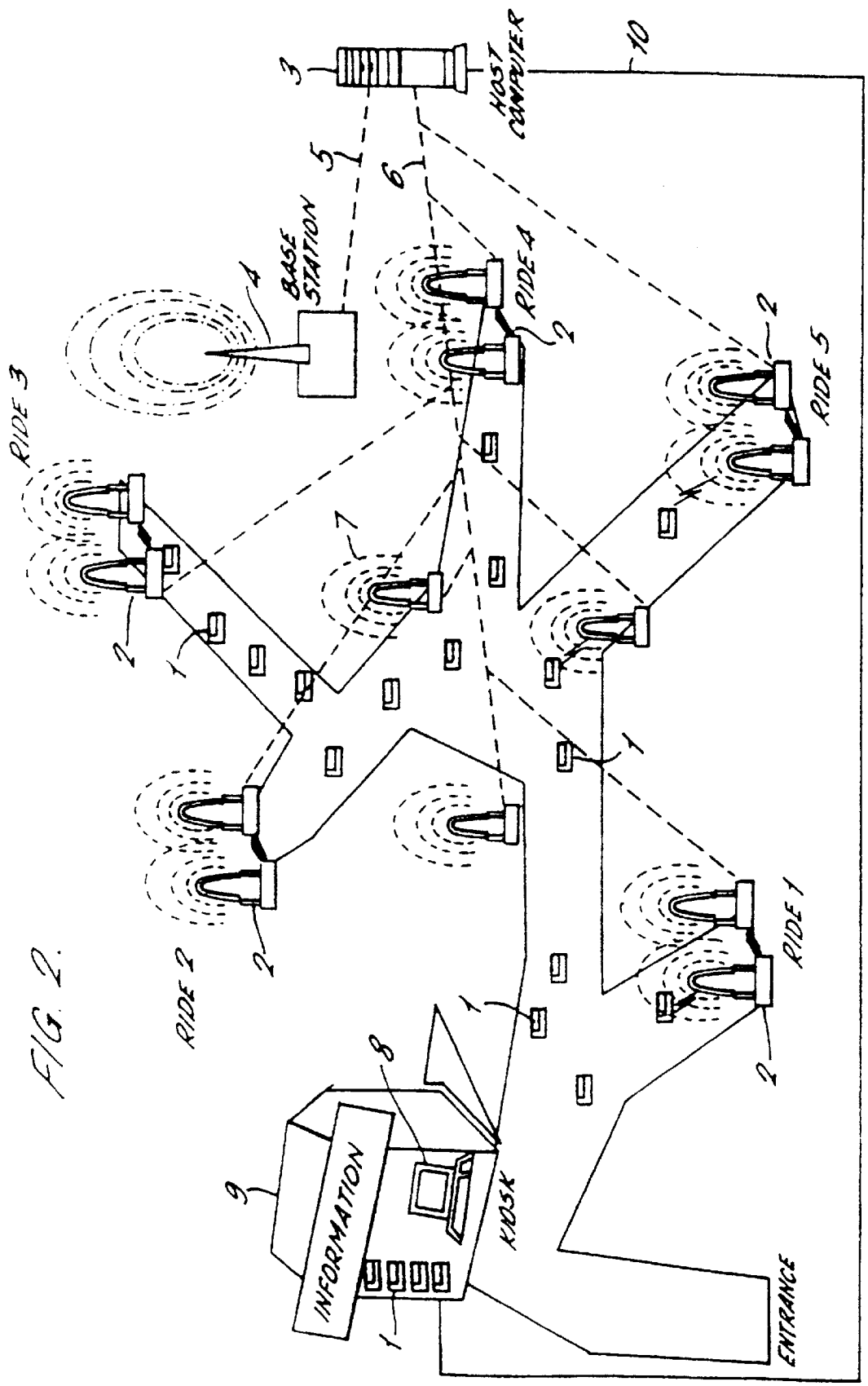
FIG. 2 is a schematic diagram of the system in operation in a theme park in accordance with one embodiment of the present invention.

FIG. 2 illustrates the arrangement of one embodiment of the present invention used in a theme park. As can be seen in FIG. 2, a central computer 3 receives downloaded identification codes from a plurality of gate units 2 positioned at various rides in the park. Also, the controlling computer 3 receives downloaded identification codes from additional module detectors 22 incorporated in locator units 7 positioned throughout the park to enable the position of portable modules to be determined.

In a theme park there is also provided a docking station 8 within an information kiosk 9. As people enter the theme park via the entrance, they can go to the information kiosk 9, take a portable module 1 from a rack and insert it in a docking station 8.

Figure 6:
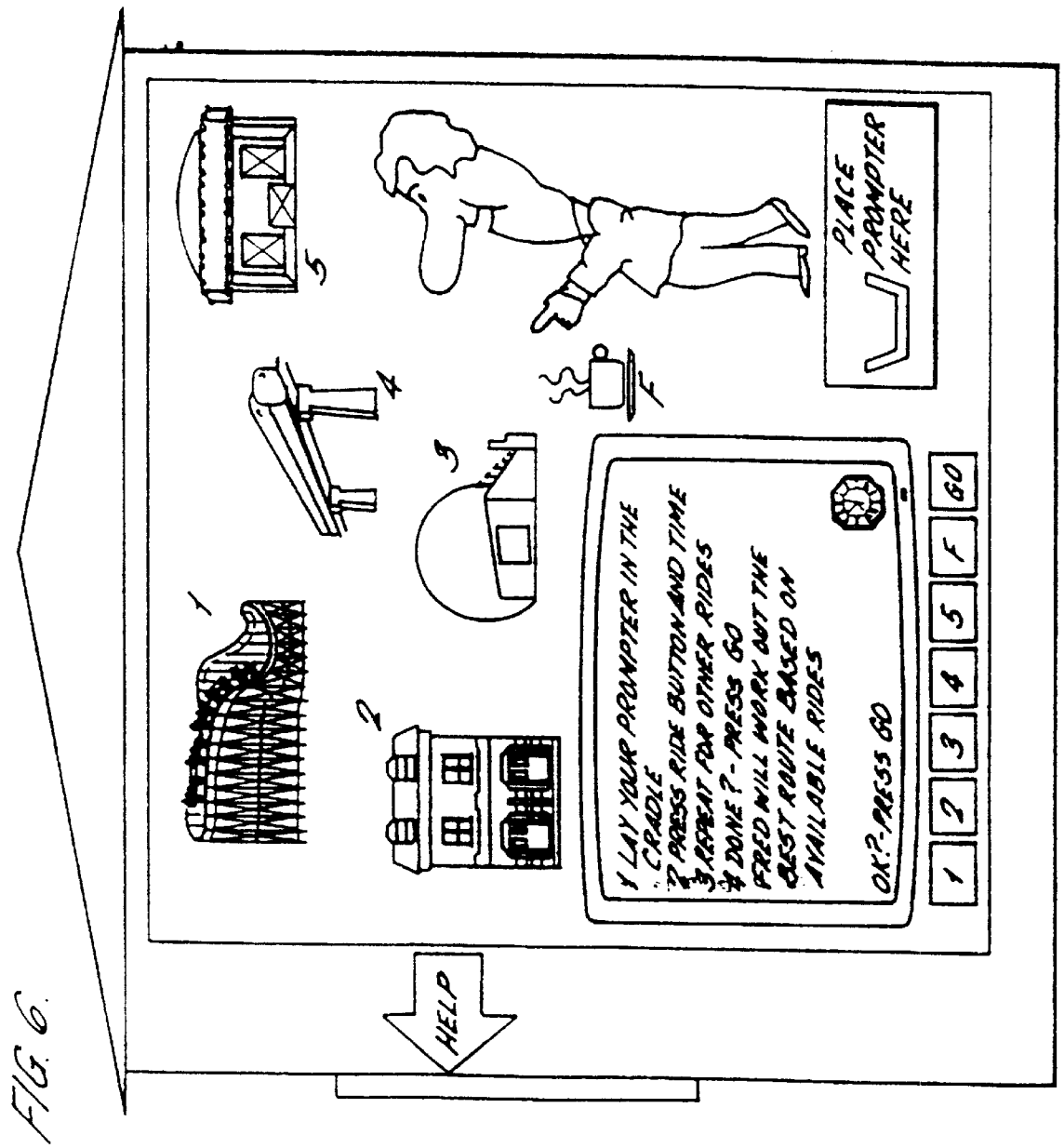
FIG. 6 is a schematic illustration of a docking station.

FIG. 6 illustrates the display which will allow the user to select the queues to be joined. In FIG. 6 the portable module has been termed a "prompter". When the prompter is docked in the docking station its identification code is downloaded and sent via the communication line 10 to the controlling computer 3.

Figure 3:
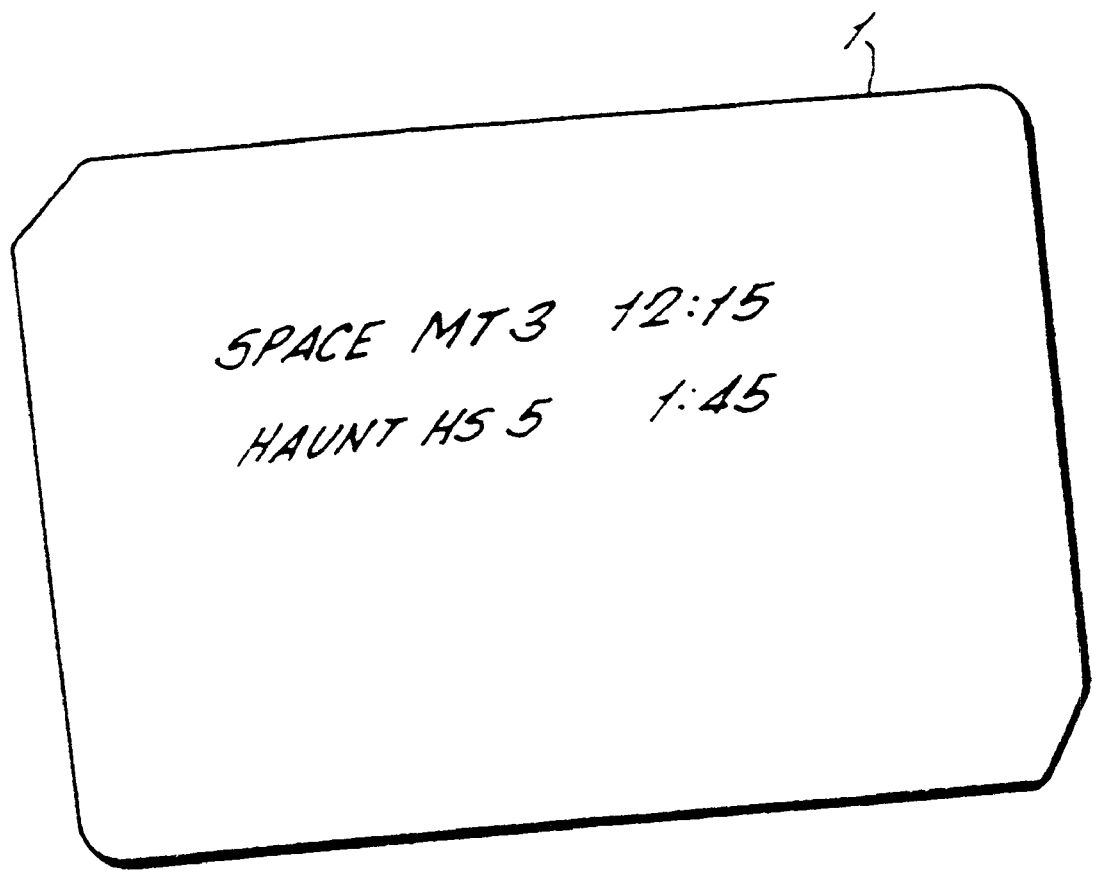
FIG. 3 illustrates the display of the portable module.
Figure 5:
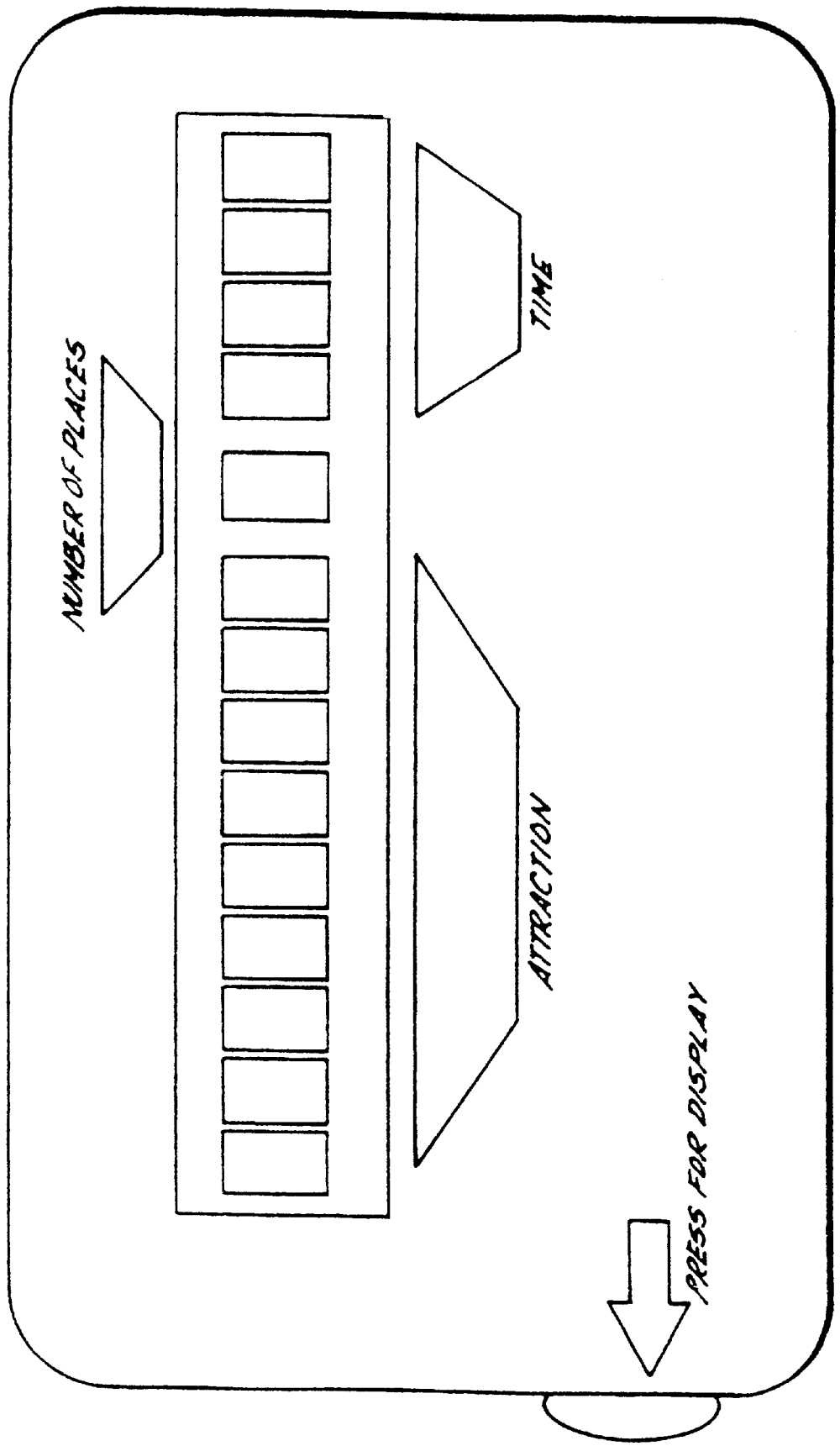
FIG. 5 is a diagram of the portable module illustrating the one line scrolling display.

Also, the queues (or rides) which the user has registered for will be sent to the controlling computer 3 together with the preferred times and preferred sequence of rides to enable the controlling computer to determine the optimum sequence and time of the rides. Once the sequence of rides has been entered and the prompter removed from the docking station, the controlling computer 3 will transmit messages to each of the prompters 1 indicating the sequence and times of the rides. Such a message is illustrated in the illustration of the prompter in FIG. 3. FIG. 5 illustrates an alternative display arrangement which allows for the display to scroll across to indicate the ride or attraction, the number of places reserved in the queue and the time at which the physical queue should be joined.

Thus having registered in the "virtual" queue for a number of rides, the user is free to utilise time which would normally be taken up by queuing by visiting other attractions in the park. When it is time to join a physical ride queue, the user will pass through or by the ride gates 2 which will detect the presence of the prompter 1 by receiving its identification code. This identification code is then downloaded to the controlling computer 3.

Thus the prompter comprises a combined short range pager unit and electronic tag which is capable of receiving messages from the central computer 3 via the transmitter 4 at the base station by techniques used in commercially available "on site pagers". The prompter 1 includes an electronic tagging system and a memory containing a unique serial number to identify the particular prompter and hence its associated user. The prompter unit is capable of transmitting the serial number when required to be detected by the module detectors 22 in the locator units 7 or by the gate units 2. The transmitter contained in the prompter can be of any conventional type such as that used in automobile remote locking or security systems.

This transmitter can be arranged either to transmit the identification signal periodically or only in response to a prompting signal from the gate units 2 or from the module detectors 22 in the locator units 7.

Figure 4:
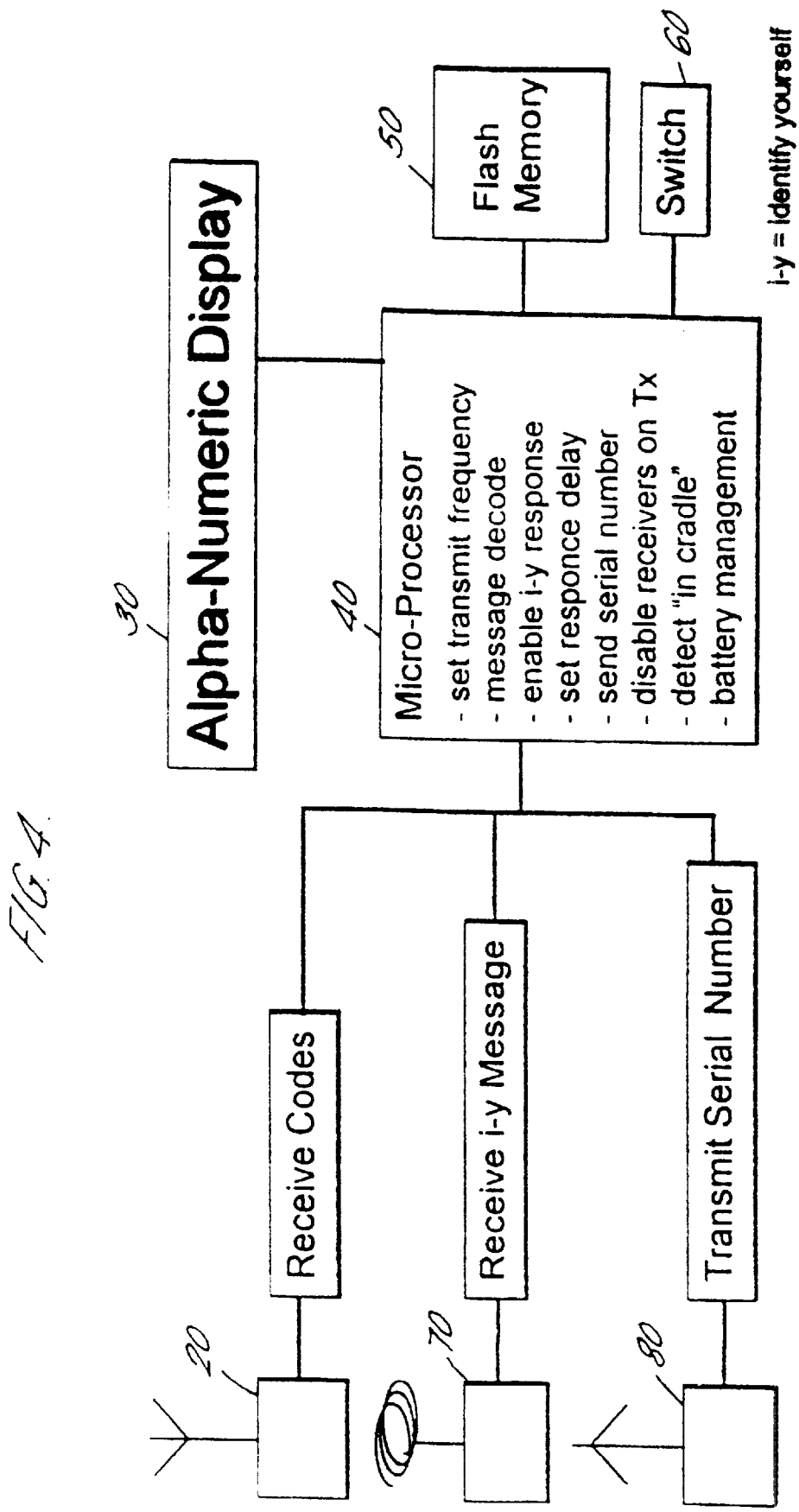
FIG. 4 is a block diagram of the portable module.

FIG. 4 is a block diagram of the portable module 1 of the present invention. A receiver 20 receives paging messages in the form of codes to cause the display of messages on the display 30. A microprocessor 40 is provided to decipher the receiver codes and the microprocessor 40 has a memory 50 and switch 60 associated therewith. The portable module also has a receiver 70 for receiving the "identify yourself" signals from the gate units 2 and the locator units 7. The microprocessor 40 is responsive to the "identify yourself" signal to record the transmission of the portable module's serial number via the transmitter 80.

The portable unit is able to display the ride sequence and times. The display can conveniently be an alphanumeric display. A simplified prompter can be provided without such an alphanumeric display with a simpler ride indication arrangement for applications which do not require readable messages.

Registration for queues by users can be received either automatically by the removal of a prompter from a dispenser for a single ride or for multiple rides he user will be required to enter manually the required rides and ride sequence following the instructions on the display as shown in FIG. 6.

Normally groups would work with a single prompter for the whole group, but it is possible for individual members of a group to each be provided with a prompter. This is an option which can be made available at the docking station whereby a group of prompter can be assigned to be associated as a group whereby their identification numbers which are downloaded to the controlling computer are marked as being associated with a group.

The identification codes of prompters can either be preloaded or downloaded from the controlling computer when the prompter is docked. Other information and commands can also be downloaded from the controlling computer, e.g. the transmission frequency of the transmitter of each prompter. Also, the language or the messages to be displayed on the display of the prompter can be selected by a user at this stage.

Thus for activities involving multiple queues, the controlling computer can accept time and sequence preferences from the user during registration. The user also has the facility to reset his sequence and time preferences at any time after registration.

The controlling computer 3 will, after registration, transmit activation codes to initiate the display of messages to advise the user when they should join a physical line, or to display other standard messages. A suite of standard messages, each enabled by its activation code, is stored in read-only memory (ROM) in the prompter to increase the number of messages that can be transmitted in the required update time. Other activation codes can produce specific modes of operation in the prompter. One particular code will enable a specific prompter to revert to a normal pager messaging mode for applications where this option is included.

The queue manager consists of a number of modules with clearly defined interfaces. Reliability through redundancy is achieved by having a duplicate computer system which operates the same software and is input with the same date. The modules are:

User Database
    record structure
        Record Entry
        Record Selection
        Record Update
Queue Database
    list of prompters queuing for each feature
        Select Information from User Database
        Add or Remove Records
        Calculate Attendance Times and Route
        Determine Optimum Queue Sequence(s)
        Calculate or Accept User Attendance Time Windows
Transmission
    messages to be sent by the base station to the prompters
        Format Messages
        Sequence Messages
        Interface to Transmitter
Interfaces
    drivers/format for communication other than transmission above
        Input Terminals
            Accept Preference Information
            Download to Prompters (serial number, frequency features as appropriate)
        Gate Units
            Correlate Signals at ride entrances Standard packages and interfaces are used wherever possible.

The gate units 2 include circuitry to at least passively listen for the transmitted identification codes and preferably include circuitry to transmit the prompting signal. The gate units will be set up at the entrance to the physical queue to control access to the queue area. The signals from such gate units can have an identification feature built in so that the prompter can recognise if it is at the correct location and provide a message to the user. Such an identification feature can be achieved by for example pulsing the transmitter on and off, modulating the signal, setting the frequency of the signal, or selective polarisation of the signal. When the gate unit 2 detects an identification code this is downloaded to the host computer. If it is determined that the identification code corresponds to an identification code within a predetermined region of the front of the queue sequence held within the memory of the controlling computer 3, the user is permitted access through the gate units. If, on the other hand, the detected identification code is not within a predetermined range on the front of the queue sequence, a signal is transmitted by the host computer to the queue area to deny the user access to the queue area. The controlling computer 3 also transmits a message to the prompter to give a reason as to why access has been denied. Access could be denied because the user has arrived either before or after the time, is at the wrong ride or the user is at the wrong ride and at the wrong time.

Throughout the park area, locator units 7 incorporating additional module detectors 22 are provided simply to collect detected identification codes of prompter in the vicinity. These detected identification codes are downloaded to the controlling computer 3 to enable the controlling computer 3 to monitor the location of the prompter I within the park.

In large systems there is a likelihood of interference between transmitted identification codes of prompter in the locality of the gate units 2 or the locator units 7. There are a number of ways in which this problem of interference can be reduced or avoided. The queue control infrastructure and gate unit positioning can be appropriately designed in order to provide sufficient separate between prompters, e.g. by using turnstiles, barriers and the like. Also, the power level of the transmitters of the prompters can be reduced and the sensitivity of the receivers of the gate units 2 and the locator units 7 altered. Further, a random or pseudo-random delay can be introduced into the response time of the transmitters to the prompting signal from the gate units 2 and locator units 7. Alternatively, different prompters can use different frequencies. Further, responses from the portable units can be sequenced by the controlling computer sending enabling activation codes such that only a certain proportion of the prompters which share the same transmitter frequency can respond at any one time. Another method of overcoming interference problems is to allow the prompter to transmit its identification code more than once while it is in the vicinity of the gate unit 2 or the locator unit 7.

Figure 8:
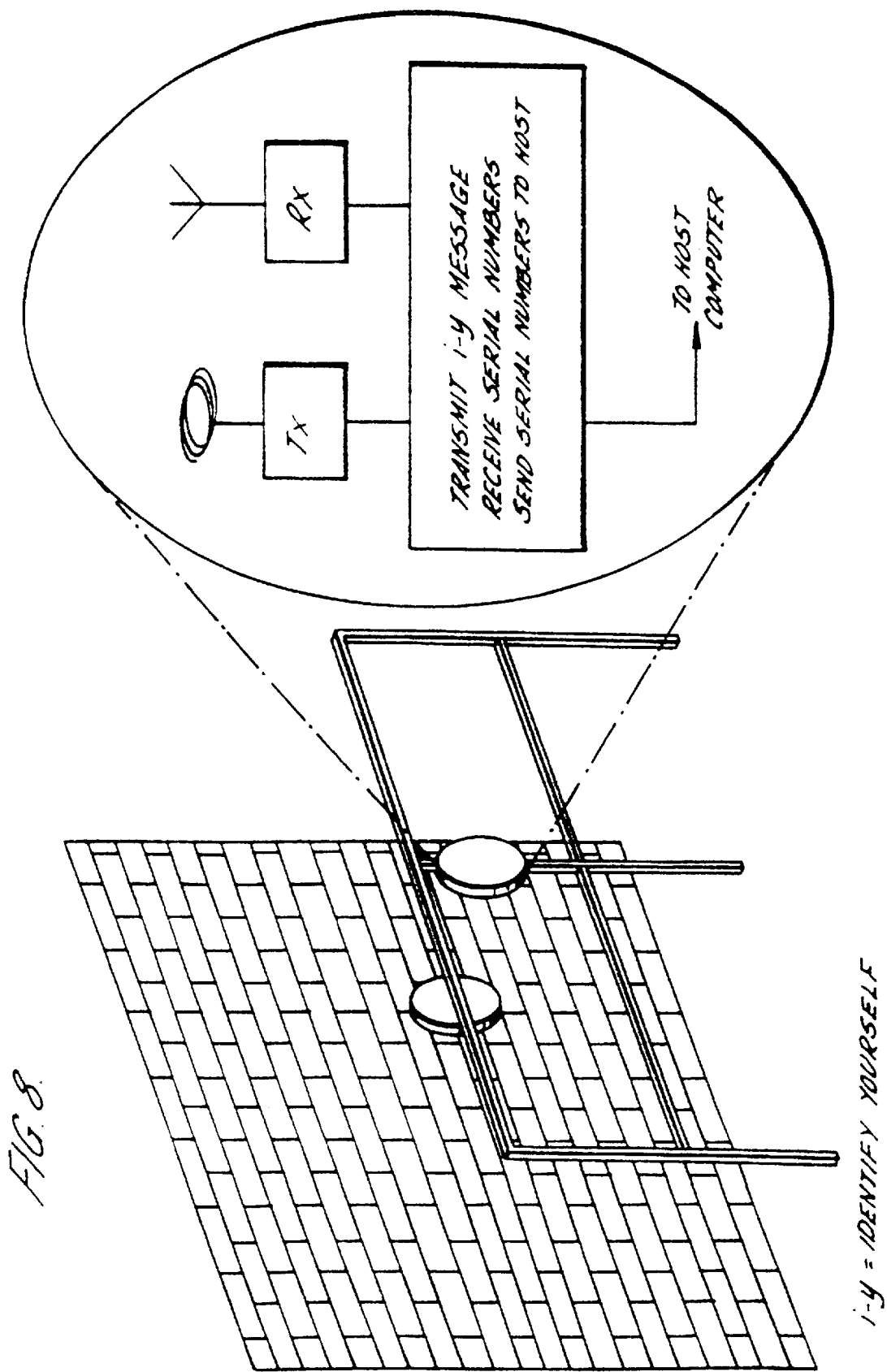
FIG. 8 illustrates a gate unit in accordance with one embodiment of the present invention.

FIG. 8 illustrates one arrangement for a gate unit 2. A receiver is placed either side of a gateway to detect identification codes of prompter carried by users as they pass through the gate. The identification codes detected by the two detectors are correlated to determine whether a prompter is merely in the vicinity or has passed between the detectors.

Figure 7:
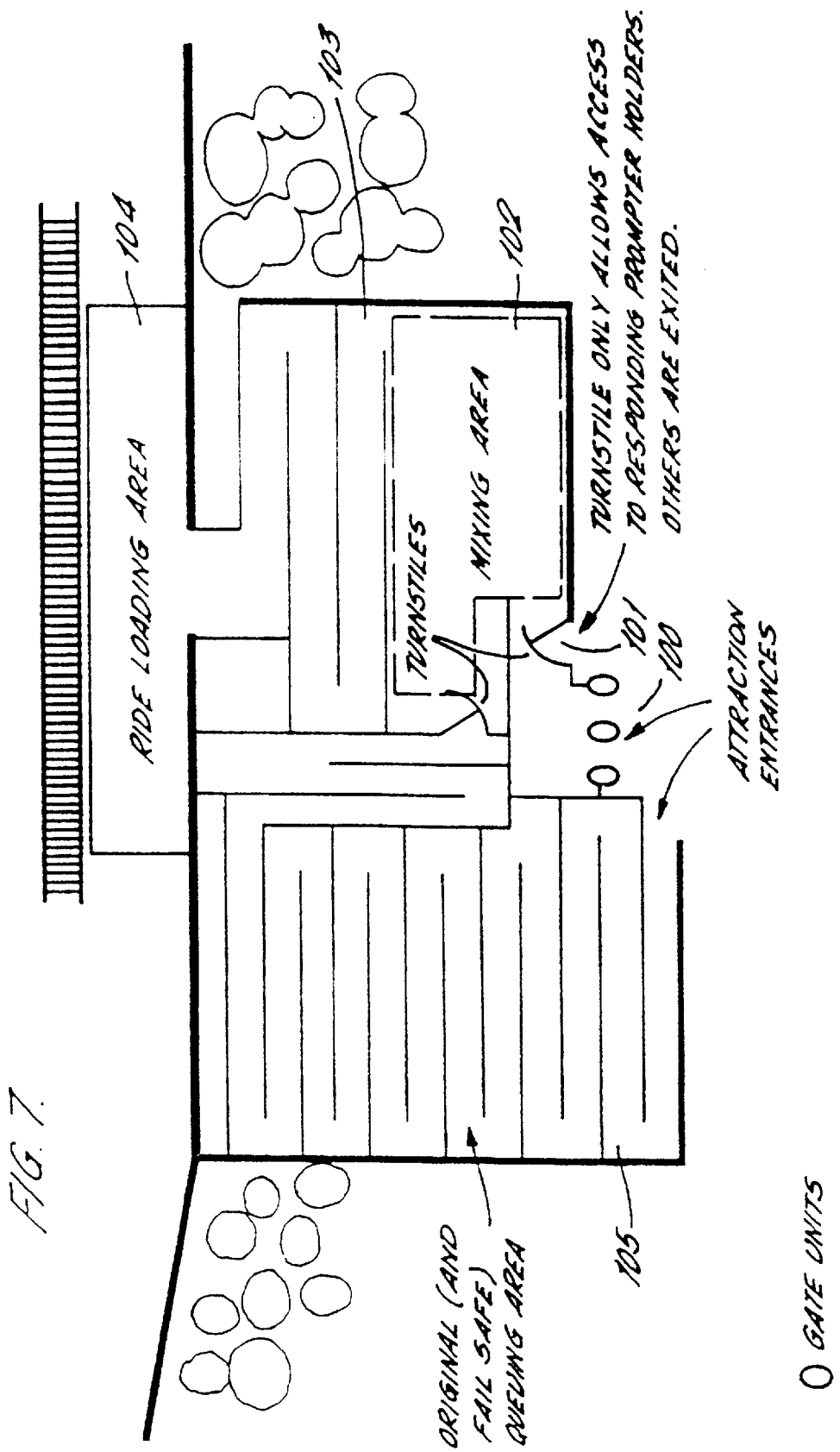
FIG. 7 is a schematic diagram of a typical ride queuing area.

FIG. 7 illustrates a ride queuing area wherein there are provided entrance gates 100 through which users pass. If the users are early, late, or in the wrong queue, the turnstile 101 will deny access into the mixing area 102 which is the end of the short queue 103 for the ride loading area 104. As can be seen in FIG. 7, this ride queuing area allows for the park to allow for only some users to use the portable units. Park users without portable units will have to join the conventional long queue 105.

Thus installation of the queue management system should maximum ride/show utilisation, ease park management issues, raise spending on secondary attractions and most importantly, greatly increase customer satisfaction. Some modification of the queuing infrastructure in the park is required, and staff could carry portable modules for communication purposes and to give their management information on their location.

The park management benefits will include the following:

1) greater control in crowd movement,
2) increased staff control,
3) information in advance on user movement preferences,
4) the ability to shorten attendance time when required by controlling routing and attraction attendance such that users will be led to exit areas earlier, and
5) automatic supply of information for customer research.

The system would require minimal staff assistance to minimise staff increase and, where- appropriate infrastructure design, the system is failsafe defaulting to exiting systems in case of a catastrophic fault. The park visitor or user would use terminals installed at park entry points and at information kiosks throughout the park to enter ride and time preferences. The system would request other relevant information such as height or health status, which may be relevant in allowing access to certain rides and information such as the need for a stroller or wheelchair. In the case of a group of visitors sharing one portable module, information on each individual will be required.

Whilst in certain applications all users or user groups would carry prompters, partial usage would be possible as a premium service with an increase in the standard fee.

The controlling computer 3 can store information in a database on each user and each member of a group, e.g. prompter serial number, relationship to other prompters or on tags, arrival time, preferred language, attract preferences, time preferences, calculated optimum route, the number in the group, attraction restriction information by individual user, other relevant information on the user, e.g. any relevant disability, baby being carried, stroller present etc., optional services activated (which might require additional user information), and credit available (where applications where individual ride tickets are used and the portable modules acts an electronic ticket).

The controlling computer 3 can operate to include a procedure which can ensure that a user registering late in the day would be given access to the same number of queues as a user registering earlier in the day. Such a user could loin certain queues near the front. The structuring and managing of the queues are features which can be customised to suite a particular situation. The controlling computer 3 will thus operate in accordance with the customised algorithm to manage the queues.

The controlling computer 3 can be programmed to re-allocate every user's sequence used in accordance with a preset algorithm or to cope with unexpected events. In order to warn the user of this possibility, when the user registers and is shown a route to the queues, and the queue sequence, an explanation of this possibility will need to be presented to the user.

Three examples of situations which could result in the re-allocation of every user's sequence are 1) The theme park is lightly loaded and certain rides are to be closed down. The late users may not physically be able to get from one ride to another in time without some re-arrangement of queues, even though slots are available.
2) It may be policy that every user gets a minimum number of rides (depending on the time registration). If the weather meant that a park was lightly loaded in the morning but full in the afternoon, the morning attendees may have had a large number of rides. These morning attendees could then be given a reduced number of rides in the afternoon to allow an increased number of rides to the late attendees.
3) If ride failure occurs it may be fairer to reallocate all the queues.

As described hereinabove, the portable module of the present invention can utilise conventional paging message techniques.

The POCSAG protocol is one of a number of messaging protocols used in paging. Any protocol can be modified in a similar way to provide the activation of pre-stored messages. The framing structure is as follows

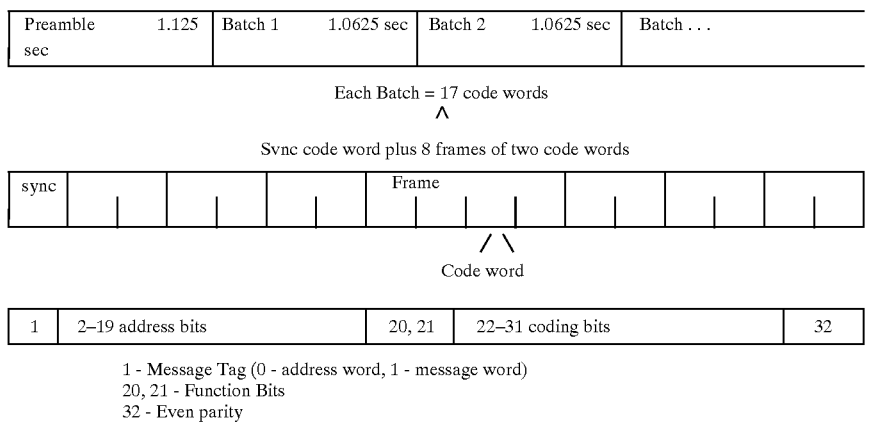

Possible activation codes are shown in the table below and these are such that one frame is needed to define a command or initiate a pre-stored message, except when special features such as the text messaging mode is used.

The standard structure could be modified as follows:

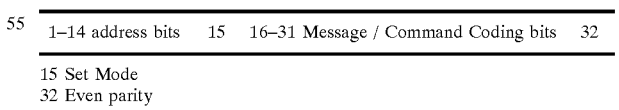

15 Set Mode
32 Even parity

Prompters store and display two messages, one each for the next and subsequent attraction The second message is sent every 5th time slot, the first message every other Messages and commands are shown in the next two tables Special Mode and Programming Commands cannot be transmitted by the base station. They are only used when prompter is in a kiosk docking station, or at the maintenance base for programming The standard messages, with various language versions if required are stored in memory in the prompter.

TABLE 1

Control and Pager Modes (Bit 15 = 1)

| 16 | Bit Positioning and Meaning | | | Note |
|---|---|---|---|---|
| 1 | Control Mode | | | |
| 1 | | 17/18 | 20–31 | |
| 1 | | 00 | Command Mode (Normal) | |
| 1 | | | Enable I-Y response | |
| 1 | | | Continuously transmit serial # | |
| 1 | | | | |
| 1 | | 01 | Special Mode (Cradle) | |
| 1 | | | Select language | x choices |
| 1 | | | Set Transmit Frequency | |
| 1 | | | Set Other Parameters | |
| 1 | | | Flash Memory Download | |
| 1 | | | Programming Mode | |
| 1 | | | | |
| 1 | | 10 | Message Mode | |
| 1 | | | Contact Nearest Kiosk | |
| 1 | | | Stay Where You Are | |
| 1 | | | Go to Nearest Kiosk | |
| 1 | | | Call Your Home | |
| 1 | | | Call Your Office | |
| 1 | | | / | |
| 1 | | | Park Closing | |
| 1 | | | Ride Restrictions Apply | |
| 1 | | | | |
| 1 | | 11 | Special | |
| 0 | Pager Mode | | | |
| | 17–31 | Two Character Bytes | | |
| 0 | First Byte can enable certain standard message | | | eg Call the following number |

TABLE 2

Normal Mode (Bit 15 = 0)

| Bits | Message Class | Message Specific | Display |
|---|---|---|---|
| 16 | First / second attraction message | sets location to store the updated message | |
| 17–24 | Attendance time | Time (240 time slots in 12 hours) | yy:zz |
| 25–27 | Number of Places | | Number from 1–8 |
| 28–31 | Attraction | Blank | |
| | | Space Ride | Ride/Feature Name |
| | | Bear Show | -*- |
| | | Rocky Hill Railway | -*- |
| | | \ | \ |
| | | Haunted Cottage | -*- |
| | | Mission to Venus | -*- |
| | | Restaurants | |
| | | French Restaurant | -*- |
| | | Italian Restaurant | -*- |
| | | Slow Food Restaurant | -*- |
| | | Japanese Restaurant | -*- |
| | | Club 34 | -*- |
| | | Attraction Closed | Out of Service |

In the POCAG protocol it is possible to refresh the messages of more than 4,000 portable modules every three minutes. If different pager frequencies are used, the number of portable modules from which the messages can be refreshed in three minutes increases by the number of frequencies used. Thus, this arrangement can provide for a large number of users in a multiple queue environment.

Although in the embodiments described above a single transmitter 4 was employed to transmit messages to the portable modules, it will be apparent that in an alternative embodiment, a plurality of transmitters may be used.

Figure 9:
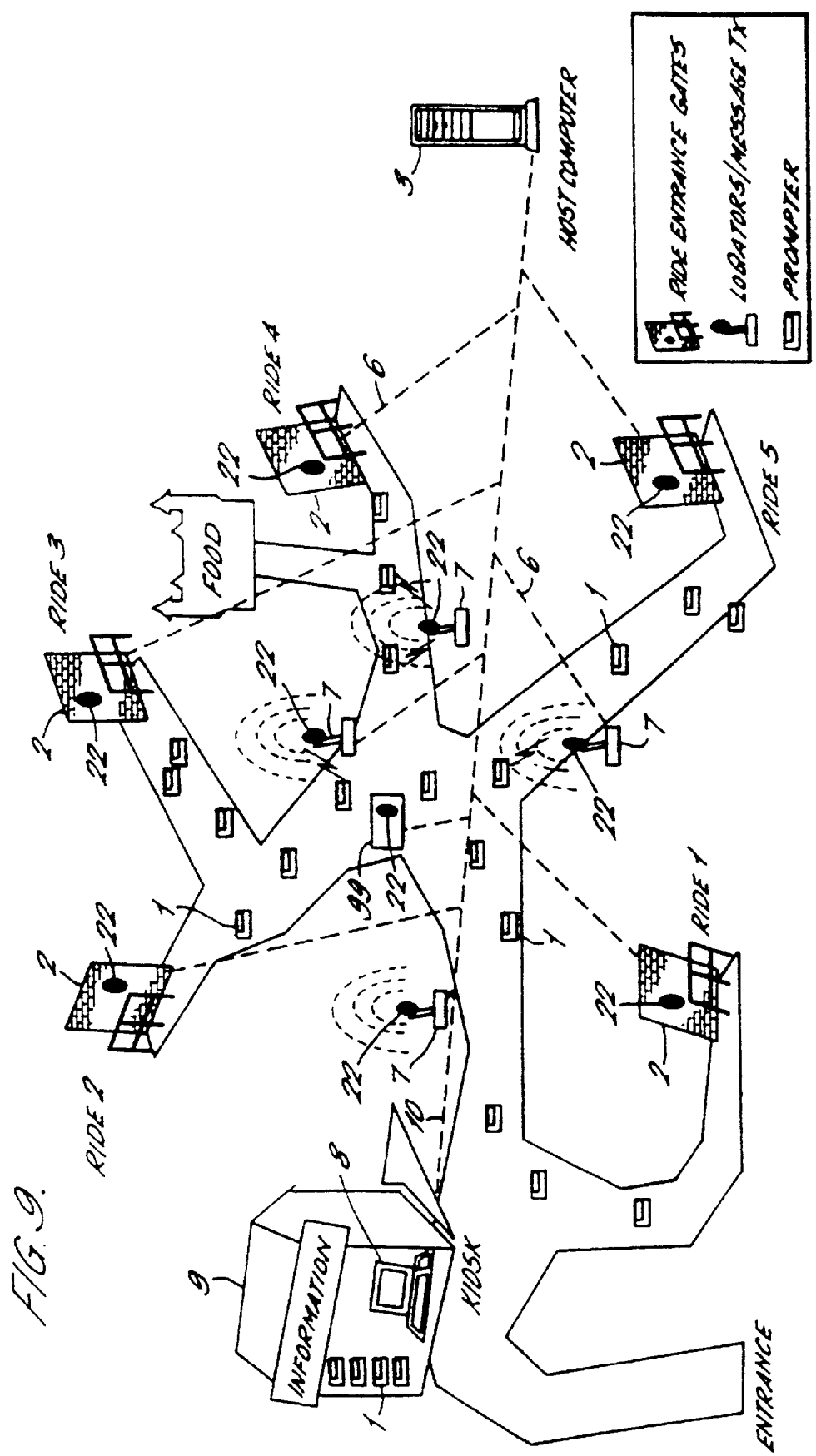
FIG. 9 is a schematic diagram of the system in operation in a theme park in accordance with another embodiment of the present invention.

FIG. 9 shows a system in accordance with another embodiment of the present invention in operation in a theme park.

In this embodiment, rather than employing a single long-range transmitter, the host computer 3 sends messages to the portable modules 1 by means of short-range radio transmitters in the module detectors 22.

Gate units 2, shown in more detail in FIG. 10, are located at each ride, and each gate unit includes a single module detector 22. The gate units also comprise turnstile mechanisms, controlled by the host computer 3. The module detector in the gate unit detects prompters 1 in its immediate vicinity and passes their identification codes to the queue manager. The gate is arranged such that only prompters passing through it are detected.

Locator units 7 are distributed throughout the theme park at locations away from the queues, and each locator unit 7 includes a single module detector 22.

In addition to the docking station 8, the system further comprises a plurality of automatic registration gates 99, connected to the queue manager, and each including a single module detector 22. An example of an automatic registration gate is shown in FIG. 11.

The automatic registration gates 99 provide an alternative method of either registering for rides or amending a registration itinerary, by the user of a prompter simply passing through the appropriate automatic registration gate 99, and hence past the module detector 22. The module detector 22 detects the prompter and passes its identification code to the queue manager, which can then perform the necessary processing.

In order to register for an additional ride on the same attraction, the guest simply has to pass through the appropriate automatic registration gate 99 again.

Each automatic registration gate 99 is arranged so that only prompters passing through it are detected and may be located close to the corresponding ride, or elsewhere in the park.

In the present embodiment, each module detector 22 includes circuitry to produce an "identify yourself" signal, to detect the prompter responses, and to transmit messages to the host computer 3. The power of the transmitted "identify yourself" signal, and hence its range, is set to reflect the function of the module detector, i.e. whether it is being used in a locator unit 7, a gate unit 2, or an automatic registration gate 99.

The "identify yourself" signals are produced repetitively by the module detectors 22, with the various module detectors transmitting in sequence to help even the processing load on the host computer 3. When a sensor in the prompter 1 detects an "identify yourself" signal, the prompter respond s by simply transmitting its identification code after one of a number of predetermined delays which has been set in a Pseudo-random fashion. The identification code of the detected prompter is then sent to the host computer via a suitable method such as telemetry cabling, telephone cabling, or other methods.

The range of the "identify yourself" signals is set to provide the required accuracy in the position detection method. Also, the module detectors in the gate units 2 and the automatic registration gates 99 use lower transmitted power than those in the locator units 7, to ensure that only the prompters in their immediate vicinities, for example at the turnstiles, respond.

The use of a sufficient number of locator units 7 permits the system to obtain a fix on the location of each prompter, and the range of each locator unit 7 is 1typically 20 m. Locator units can be grouped together to enable the transmission of zone specific information. The range of the module detectors in the gate units 2 and the automatic registration gates may be about 25 to 50 cm.

The prompter can use the "identify yourself" signals from the module detectors 22 to recognise if it was at the correct location and as a result display an appropriate message.

In addition, the prompter can identify the different types of module detector (i.e. those incorporated in the gate units, automatic registration units, and locator units) by the identifying signature. This allows the prompter to set its transmitted power to the appropriate level, thus effectively setting the range of its transmitted response.

To provide short-range module detection for gate units and automatic registration gates, ranges of about 0.5 m are required for both module detector and prompter. To provide for this, the prompter has two response modes which have different numbers of time slots and transmitted power levels. One is "normal", and the other is for short ranges. The short range mode interaction is intended to be between only one prompter and the module detector.

That is, the range of the "identify yourself" signals transmitted from the module detectors in the gate units and the automatic registration gates, and the range of the identification code transmissions from prompters in response to these "identify yourself" signals, are such that these module detectors detect only one prompter unit at a time.

In contrast, numerous prompters may be within the range of "identify yourself" signals from a particular locator unit 7, which in turn may receive numerous responses at the same time.

As was the case in the previously described embodiments, when a user arrives at the theme park incorporating a queue management system according to the present embodiment, he or she is required to register and provide users' information. This is done at appropriate docking stations or terminals.

Of course, entry of the users' information could have been done remotely in a pre-registration session.

In order to get a large number of users registered quickly, various means can be employed to avoid large numbers of terminals or docking stations 8 being committed to the park entrance area. For example the terminals could be movable to points throughout the park or the park guests could enter the necessary information on cards that could be read by an automatic system.

Having obtained his or her prompter, the guest enters his or her ride and time preferences by means of docking stations 8 at the park entry points or at information kiosks throughout the park.

Preference data entry could also be done remotely, for example in local hotels, at travel agents; or by means of a dial-up booking service.

The user may, in addition, join any particular virtual queue by simply walking through the corresponding automatic registration gate. A combination of methods is possible.

Itineraries may be updated at points throughout the park at additional docking stations, automatic registration gates, information kiosks, and at reschedule units which are small, menu driven display terminals.

Certain features and modes of operation of the prompter are set by downloading appropriate commands and information from the host computer as part of the registration procedure. Prompter messages are again initiated by short activation codes transmitted to the prompters in a single protocol, and the update time varies according to the amount of time remaining before a queue must be joined.

While groups of any size may decide that each member should carry his/her own prompter, small groups may share one prompter for the whole group.

A smaller version of the prompter referred to here as a Qtag, without a display can be used by groups for location, access and security functions. The group would have one of its members carry the messaging prompter, while the rest of the group carried the Qtags. The Qtag has an audible alert sounder built in to provide a simple message. This message would normally mean "Go To Information Point" or be an identifying alert to venue staff.

In this case of groups using only a prompter and not Qtags, the controlling program in the host computer holds the number in the group in its records. In cases where more than one prompter and/or Qtag is used per group, the controlling program in the host computer recognises the prompters and Qtags as part of a group.

The Qtag is simply an rf transmitter with a timer set to cause the Qtag serial number to be transmitted at regular intervals. This interval is selected from a choice of 2, 4 and 8 seconds.

The unit is powered by a removable button battery which can be recharged external to the unit. The battery compartment is not accessible to the user as it is on the back of the unit.

The Qtags will not register a ride reservation request.

The Qtag scrap is NOT user removable, but requires the wearer to return to the issuing booth to have the strap removed.

There are wrist, angle an waistband versions.

The design of the ride entry turnstile is such that only holders of correctly responding prompters and Qtags are allowed access. Other persons passing through the ride entrance have to follow an immediate exit route allows them to return to the outside area to re-establish contact.

When only certain members of a group are eligible for a particular ride because of age, size of health restrictions, the system will only allow access to correctly registered users if all users have prompters or Qtags. If groups share a prompter it either allows access to the whole party and attendants ensure the ride restriction rules are met, or only the number of places corresponding to eligible members of the party are allowed access.

In order to control this aspect, procedures are adopted at registration to ensure the correct Qtag or prompter is carried by each person.

The Queue Manager is the controlling software program in the host computer. It uses a simple but fast customizable flat database which from which records are selected and processed to ensure the correct prompters are to be sent the appropriate messages and commands in any one batch of transmissions.

The queue manager includes means of calculating the actual time and sequence of attendance at queue entrances offered to the user. This calculation can be in response to user preferences, on the overall demand in the system and any priority attached to the particular user and would result in effectively, a recommended route. This allows considerable control of the users. Appropriate algorithms ensure that sufficient users are invited to join the physical queue at a rate that will maximise utilisation of the particular resource.

It is possible for the queue manager to disable any prompters which were being used improperly and in the multiple queue environment the system can also make an enterprise more efficient when the demand for the various resources is lower than the optimum. In this case, the system allows for the resources to be operated for only part of the time by making the appropriate queues physically available only at the corresponding times. This will result in staff and operating cost savings.

When the park was not fully busy, staff could be shared between rides by only opening them part time without causing customer complaints since their access times are controlled.

The queue manager software accepts input from the various input terminals in the park as well as from remote terminals, perhaps located in hotels serving the park. This software can record the time of arrival for applications where some time limit is to be applied.

The queue manager (QM) takes input from the park management about how it is to deal with certain circumstances, accepts ride preference requests from guests and collects information about the guest's location. This information is used to calculate and update a guest's itinerary. As guests are identified by module detectors the system will produce and sequence the messages for the particular module detector. These messages instruct guests to attend the various rides.

Where some or all of the attractions are individually priced or have separate tickets, guests could pay in advance and have the computer store the credit available. The prompter could display this credit periodically and act as an electronic ticket. Registration could be coupled with automatic payment by credit card reader.

Rides can be requested using individual reservation pillars, card readers, remote access or manual input.

Statistics and other management information is available, in some cases such as resource demand information, in advance. The software can carry out a varying amount of analysis on the real time information on user location that is produced by the system. The amount of analysis is specified by the system operator and the software is written or customised accordingly.

In order to cope with the high volume of inputs and the need to ensure rapid updating of the information transmitted to the prompter, the queue manager is written as specific application. It has a modular structure and all interfaces are completely defined. The inclusion of an expert system learning function into this part of the queue manager provides significant value in certain applications.

The data (prompter identification codes) from the module detectors arrive sequentially in batches, so that each module detector's input information and the messages to be transmitted can be dealt with in turn.

The system according to the present embodiment may be offered to a small proportion of guests for a price premium but in most cases these guests will obtain entry to the ride through an entrance which will have a limited capacity so the rate of guest arrival rate still needs to be controlled.

The system can allow different classes of guest depending on the fee paid.

Advantageously, the system may also provide show and/or restaurant reservation options.

Advantages of embodiments of the present invention are:
1) Easy and attractive audio visual question and answer interfacing to the input terminals at the docking stations by an attractive kiosk design, simple keyboard and a fun, interactive, guide character,
2) A rendezvous aid service for groups ,sing multiple portable modules and/or Qtags. A member of a group which has been split up could place his portable module in the docking station at one of the information kiosks and the system could send a message to the portable modules of the rest of his group with a suggested rendezvous point, or simply cause the audible signal of a Qtag to be emitted. The system could alternatively inform the user in what area his group members were last identified.
3) A lost child/child security service. This could optionally use a smaller portable module without the message display facility, where a specific activation code enables the ability to respond to every identify yourself message From every gate unit. An option is to have an even smaller unit without any pager receiver circuitry which would operate continuously, responding to every identify yourself message from every gate unit. Alternatively, the service could use Qtags and could provide information about the last time and place the child was detected. This information would typically be accurate to 10 minutes and 25 metres only.
4) Zone specific messages promoting other utilised attractions, other promotional messages and competitions.
5) Where separate attractions have separate tickets, the portable module could act as an electronic ticket. Registration could be coupled with automatic payment by a credit card reader in the docking station.
6) Theft or accidental removal of the portable module from the park could be controlled by having a gate unit at each of the park exits. The gate units could have signatures which would cause audible signals to be emitted by the prompters and/or Qtags. Alternatively, the gate units could detect any non-returned prompters and/or Qtags and provide a signal to the park staff.

7) Portable modules which display in multiple languages can be offered as an option.

8) Having the timing and route planned by the computer reflect how busy the park is at that time. In very busy times users would be led back to the exist area earlier, whereas in quiet times users would be encouraged to spend more time (and money) on secondary attractions.

9) Enabling the system to concentrate the park users in certain areas at certain times. This will enhance the "atmosphere" for users in quiet times and allows savings on ride operating costs and staffing costs to be made. A certain proportion of the rides could be closed for part of the day without customer displeasure as they are not offered those rides when they are closed.

10) The ability to issue an alert if any prompter has not been located within a specified period.

11) Promoting the hotels associated to the park as these could exclusively offer advance registration as an advantage over other hotels.

12) A version of the prompter, which need not necessarily have a display of its own, could cause a message to be displayed on a separate apparatus in the vicinity. So that, for example, if someone was celebrating a birthday and the system had been appropriately programmed, the normal prompter/loqator interaction could detect the presence of the person concerned and flash up an appropriate greeting on a nearby display unit. Alternatively, the normal prompter messages could be displayed on these fixed display units when the intended recipients of those messages are n the vicinity.

Although the present invention has been described hereinabove with reference to specific embodiments, the present invention is not so limited and modifications falling within the scope the claims will be clear go a skilled person in the art.

What is claimed is:

1. A queue management system for managing at least one queue of people, the system comprising:

a plurality of portable modules, each portable module being arranged to be carried by a person and including a memory means for containing a unique identification code, indicator means for indicating to said person when it is time to join the queue, a signal receiver means for receiving signals to cause said indicator means to be operative, a transmitter means for transmitting said identification code over a short range to confine the transmitted identification code to a local region around said person, and a docking means for downloading said identification code when said portable module is docked;

at least one docking station, each docking station being adapted to co-operate with said docking means of a said portable module for registering said person in a queue sequence for a respective queue by downloading said identification code from said portable module when docked;

a queue manager for maintaining the queue sequence for each queue and including a first communication means for receiving the downloaded code;

a signal transmitting means associated with said queue manager for transmitting said signals to each portable module to instruct said person carrying said portable module to join the queue;

at least one module detector for detecting any portable modules in a vicinity of the module detector by detecting any transmitted identification codes, said module detector being arranged at a location of the queue to detect when the person carrying said portable module joins the queue; and a second communication means arranged between said queue manager and the module detector to communicate any detected identification codes to said queue manager;

said queue manager being adapted to update each queue sequence using the detected identification code and the downloaded identification code to remove the detected identification code from a front of the respective queue sequence and to add the downloaded identification code to a back of the respective queue sequence.

2. The queue management system as claimed in claim 1, wherein said signal transmitting means is adapted to transmit radio paging messages to each portable module, and said signal receiver means of each portable module is adapted to receive said radio paging messages.

3. The queue management system as claimed in claim 1, including at least one additional module detector provided at locations away from the queue for detecting any portable modules in the vicinity of the additional module detector by detecting any transmitted identification codes, the additional module detector being connected to said queue manager by said second communication means, and said queue manager being adapted to use any identification codes detected by the module detector and the additional module detector to track the locations of each person carrying a said portable module.

4. The queue management system as claimed in claim 1, the system further comprising at least one automatic registration gate connected to said queue manager by said second communication means, said automatic registration gate corresponding to a respective queue and including a module detector arranged to detect only portable modules passing through the automatic registration gate by detecting any transmitted identification codes, and said queue manager adapted to update the respective queue sequence using the identification codes detected by the automatic registration gate to add the detected identification codes to the back of the respective queue sequence.

5. The queue management system as claimed in claim 1, wherein at least one of said module detectors arranged at the location of the queue is incorporated in a gate unit, and is further arranged to detect only the transmitted identification codes of portable modules passing through the gate unit.

6. The queue management system as claimed in claim 1, wherein at least one of said module detectors arranged at the location of the queue includes a pair of detecting antennae arranged as a gate through which a person carrying said portable module will pass to join the queue, the module detector including a correlation means to correlate signals for any detected identification code from said pair of detecting antennae to determine whether said portable module has passed therethrough and if so to pass the detected identification code to said second communication means.

7. The queue management system as claimed in claim 6, wherein the module detector includes means to pass to said second communication means any detected identification codes flagged as representing portable modules being only in the vicinity of the module detector if said correlation means determines that the portable modules have not passed through said pair of detecting antennae.

8. The queue management system as claimed in claim 1, wherein said signal transmitting means comprises at least one transmitter.

9. The queue management system as claimed in claim 1, wherein said signal transmitting means comprises at least one signal transmitters, the at least one signal transmitter being provided in a respective one of said module detectors.

10. The queue management system as claimed in claim 9, wherein said at least one signal transmitter is a short-range radio transmitter.

11. The queue management system as claimed in claim 1, wherein said transmitter means of each portable module is adapted to periodically transmit the identification code stored in said memory means.

12. The queue management system as claimed in claim 1, wherein the module detector includes a prompting transmitter for transmitting a prompting signal over a short range to cause any portable modules in range to respond by transmitting their identification codes, each portable module including a prompt receiving means for receiving said prompting signal, said transmitter means of each portable module being responsive to the received prompting signal to transmit the identification code stored in said memory means.

13. The queue management system as claimed in claim 12, wherein said transmitter means of each portable module is adapted to transmit said identification code after a random or pseudo-random delay after said prompt is receiving means receives said prompting signal.

14. The queue management system as claimed in claim 11, wherein said transmitter means of at least some of said portable module transmit said identification codes at different frequencies.

15. The queue management system as claimed in claim 12, wherein said prompting transmitter of the module detector transmits an identifying prompting signal, and said portable module includes identification means to compare said identifying prompting signal with a stored prompting signal corresponding to the respective queue to determine whether a person is at the correct queue, and means to indicate to the person whether or not the person is are located in the correct queue.

16. The queue management system as claimed in claim 12, wherein said prompting transmitter transmits an identifying prompting signal indicative of a range of identifying prompting signals, and said "range of" portable module is operable in response to said identifying prompting signal to set the range of its identification code transmission.

17. The queue management system as claimed in claim 1 for use in a defined area having at least one exit for people carrying said portable modules, the system including at least one said module detector at each exit to detect portable modules to prevent the portable modules being removed from said defined area.

18. The queue management system as claimed in claim 1, wherein said queue manager is adapted to load an identification code into said memory means of said portable module using said first communication means when said portable module is docked in a said docking station to register said person in the queue sequence.

19. The queue management system as claimed in claim 1, wherein the identification code is preloaded in said memory means of each portable module.

20. The queue management system as claimed in claim 1 wherein the docking station includes a queue display means for displaying a selection of queues which the person may wish to join; an input means to allow the person to select which queue they wish to join; and a downloading means for downloading the identification code of the docked portable module and passing the downloaded identification code to said queue manager via said first communication means, and for passing a queue identity for the queue which the person wishes to join to said queue manager via said first communication means; said queue manager being adapted to register the person in at least one said queue sequence dependent upon the downloaded identification code and the received queue identity.

21. The queue management system as claimed in claim 20, wherein said queue display means and said input means of the docking station is adapted to respectively display requests for data on the person and to allow an input of such data for transmission to said queue manager via said first communication means.

22. The queue management system as claimed in claim 1 wherein said indicator means of the portable module comprises a display to display messages indicative of the queues for which the person is registered to join and a time at which the queues should be joined.

23. The queue management system as claimed in claim 22 wherein said docking station is adapted to allow the person to select a preferred sequence of queues to be joined and preferred times of joining the queue, and to reselect said preferred sequence and said preferred times.

24. The queue management system as claimed in claim 22 wherein said queue manager is adapted to optimise a position of a person in each of a plurality of queue sequences to allow the person to join each queue and attend each event being queued for.

25. The queue management system as claimed in claim 24, wherein said queue manager includes a queue information storage means to store information on a predicted rate at which the queue will move and/or an actual rate at which the queue is moving, said queue manager being adapted to use said stored information to optimise a length of the or each queue sequence and to enable an optimisation of a sequence of queues.

26. The queue management system as claimed in claim 22, wherein said queue manager is adapted to control said signal transmitting means to transmit data on the queue sequence and times at which the queues should be joined, and said memory means of the portable module is adapted to store said data.

27. The queue management system as claimed in claim 22, wherein the portable module includes a message memory for storing a plurality of standard messages, said queue manager being adapted to send a desired message activation signal to selected portable modules using said signal transmitting means, and said selected portable modules being adapted to display a desired message from said stored plurality of standard messages on said display in response to said activation signals.

28. The queue management system as claimed in claim 22, wherein said queue manager is adapted to send a control signal to selected portable modules, said selected signal to switch mode of operation to operate as a radio pager.

29. The queue management system as claimed in claim 22, including an access control mechanism associated with the module detector to allow access to a queue area for a queue, said queue manager being adapted to compare a detected identification code with the identification codes of the queue sequence associated with the queue to determine if said detected identification code falls within a predetermined range of the front of the queue sequence, and to transmit an access denied signal over said second communication means to said access control mechanism if said detected identification code is determined to be outside said predetermined range, said access mechanism being responsive to said access denied signal to prevent the person carrying the portable module associated with the detected identification code from gaining access to the queue area.

30. The queue management system as claimed in claim 29, wherein said queue manager is adapted to transmit an explanatory message signal to the portable module which has been denied access to the queue area to explain a reason why access has been denied.

31. The queue management system as claimed in claim 29, wherein said portable module is adapted to store a default acceptance time window associated with each queue for which the identification code of the portable module has been entered in the queue sequence reason messages, wherein if the portable module has has been denied access being adapted to identify the module detector to determine whether the portable module is at the correct queue area at the correct time, and to select and display an appropriate reason message to explain why access has been denied.

32. The queue management system as claimed in claim 22, wherein a plurality of said portable modules can be assigned as group, each member of a group of portable modules having an identification code which identifies which group the portable module belongs to, the docking station being adapted to allow a selection of the option for an option for members of a group of people to each have a portable module.

33. The queue management system as claimed in claim 32, wherein said docking station is adapted to allow a member of the group of people to input a group specific message to said queue manager via said first communication means when the member's portable module is docked, said queue manager being responsive to said group specific message to transmit a message to all members of the group of people.

34. The queue management system as claimed in claim 32, wherein said queue manager is adapted to monitor the locations of said portable modules, the docking station including means to input a location request to request the location of the group members when one of the group member's portable module is docked, said queue manager being responsive to said location request to transmit information on the location of the members of a group of people for display by the docking station.

35. The queue management system as claimed in claim 22, wherein said queue manager is adapted to monitor the locations of said portable modules and to send area specific messages to portable modules known to be in at least one specific area.

36. The queue management system as claimed in claim 22, wherein said queue manager is adapted to program a language for messages displayed on said display of said portable module when said portable module is docked.

37. The queue management system as claimed in claim 27, wherein said queue manager is adapted to send messages stored in said message memory of said portable module when said portable module is docked.

38. The queue management system as claimed in claim 1, wherein said queue manager is adapted to set frequency of said transmitter means of said portable module when said portable module is docked.

39. The queue management system as claimed in claim 1 including a plurality of portable tagging modules, each portable tagging module being arranged to be carried by a person to be tracked, comprising a memory means for containing a unique identification code, a transmitter means for transmitting said identification code over a short range to confine a transmitted identification code to a local region around the person carrying the portable tagging module, and a docking means for docking with the docking station for downloading said identification code to said queue manager; the or each docking station being adapted to allow a person carrying said portable module to associate at least one said portable tagging module with said portable module, said docking station having prompting means for prompting the selection of a tagging option when said portable module is docked to download the identification code thereof, said means prompting subsequently requesting the docking of a said portable tagging module to download the identification code thereof; said queue manager being responsive to said means for prompting and said downloaded identification codes to associate said identification codes; the docking station including a means to transmit a location request signal for an associated identification code of a portable module or portable tagging module when a portable module or portable tagging module is docked; said queue manager being responsive to said location request signal to transmit information on the location of the associated portable module or portable tagging module to said docking station for display thereby.

40. The queue management system as claimed in claim 39, wherein each portable tagging module includes a receiver for receiving prompting signals from the module detector, said transmitter of each portable tagging module being responsive to said prompting signals to transmit said identification code.

41. The queue management system as claimed in claim 1, wherein the docking station includes a payment means for receiving payment with respect to a queue which has a fee associated therewith, said payment means being adapted to request payment and await receipt of payment before registering the person in the queue sequence for a desired queue which has a fee associated therewith.

42. The queue management system as claimed in claim 1, wherein the docking station includes payment means for receiving a payment to be credited to the person carrying said portable module and to be associated with the identification code of said portable module; said queue manager including a credit storing means for receiving and storing information on the payment to be credited to a portable module from said docking station, a queue cost information memory containing information on the cost of each queue which has a fee associated therewith, a debiting means for debiting funds from a credit stored in said credit storing means for the portable module when said queue manager receives a detected identification code from said module detector at a queue which has a fee associated therewith; said queue manager being further adapted to transmit information on the credit stored in said credit storing means for the portable module to said portable module for display thereby.

43. The queue management system as claimed in claim 41, wherein said payment means comprises a credit card reader.

44. The queue management system as claim 41, wherein said payment means comprises a credit card reader.

* * * * *

UNITED STATES PATENT AND TRADEMARK OFFICE
CERTIFICATE OF CORRECTION

PATENT NO. : 6,529,786 B1
DATED : March 4, 2003
INVENTOR(S) : Leonard Sim

It is certified that error appears in the above-identified patent and that said Letters Patent is hereby corrected as shown below:

Column 1,
Line 58, delete the word "or" and insert -- of --.

Column 7,
Lines 19-21, delete "Embodiments of the present invention will now be described with reference to the accompanying drawings in which:" and insert the heading -- BRIEF DESCRIPTION OF THE DRAWINGS --.
Line 42, insert the heading -- DETAILED DESCRIPTION OF THE ILLUSTRATIVE EMBODIMENTS --.

Column 21,
Line 39, delete the word "are".

Column 23,
Line 6, delete the word "has".

Signed and Sealed this

Twenty-sixth Day of August, 2003

JAMES E. ROGAN
*Director of the United States Patent and Trademark Office*